No. 804,184. PATENTED NOV. 7, 1905.
C. H. BOECK.
HEATER.
APPLICATION FILED JAN. 11, 1904.
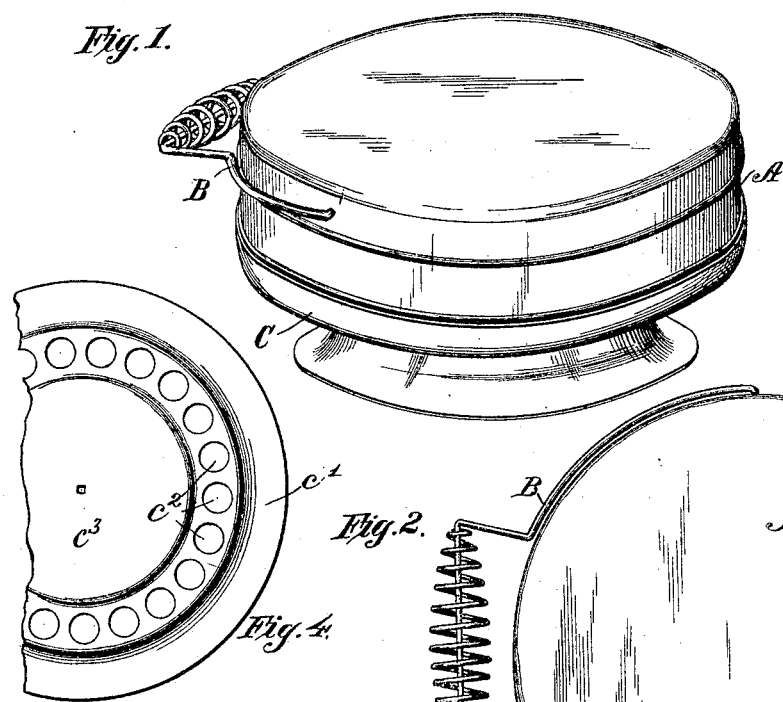
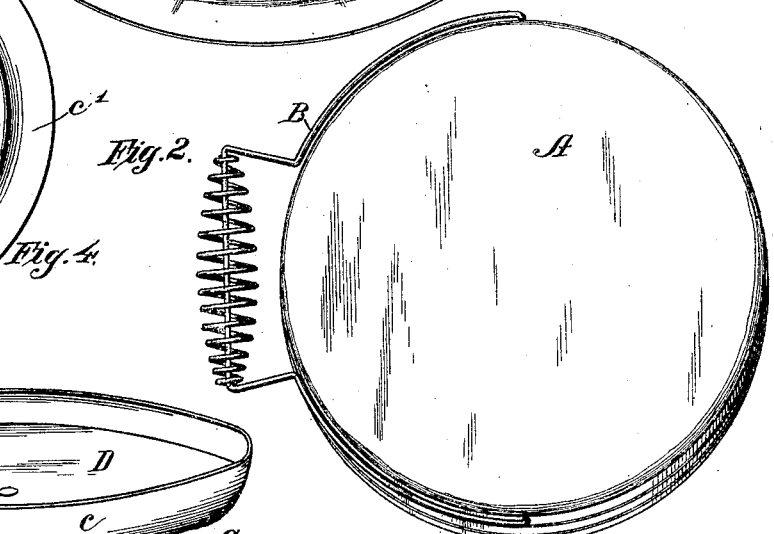
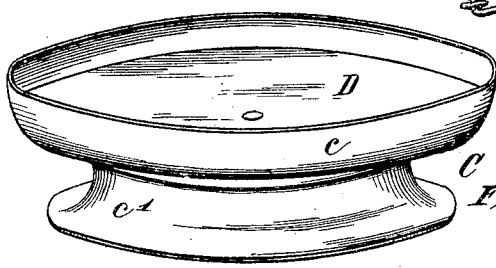
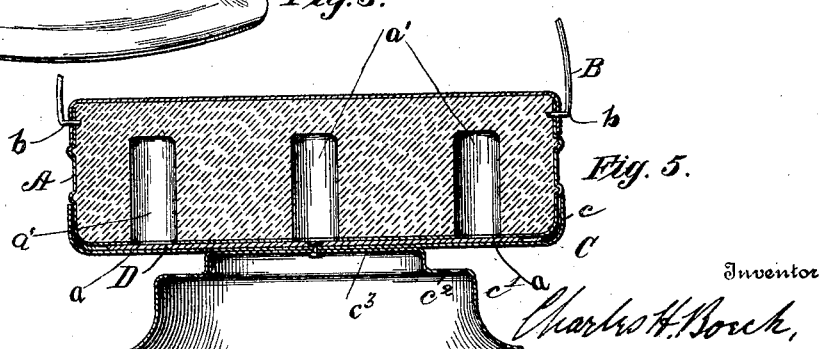
Witnesses
H. S. Austin
K. M. Cromelin
Inventor
Charles H. Boeck,
By Julian C. Dowell
his Attorneys

UNITED STATES PATENT OFFICE.

CHARLES H. BOECK, OF JACKSON, MICHIGAN, ASSIGNOR, BY MESNE ASSIGNMENTS, TO METAL STAMPING COMPANY, OF JACKSON, MICHIGAN, A CORPORATION OF MICHIGAN.

HEATER.

No. 804,184.     Specification of Letters Patent.     Patented Nov. 7, 1905.

Application filed January 11, 1904. Serial No. 188,557.

*To all whom it may concern:*

Be it known that I, CHARLES H. BOECK, a citizen of the United States, residing at Jackson, in the county of Jackson and State of Michigan, have invented certain new and useful Improvements in Heaters; and I do hereby declare the following to be a full, clear, and exact description of the invention, such as will enable others skilled in the art to which it appertains to make and use the same.

My invention relates to that class of auxiliary heaters designed for warming dishes or other articles or for keeping warm coffee-pots, platters, or other vessels containing food after removal from the stove and in which a heat-retaining substance adapted to be preheated is employed as the warming agent.

The invention provides an efficient device of this character of simple construction and neat and attractive design, an improved construction of heating-pad therefor having an outer shell or receptacle and a compact filling of heat-retaining substance rendering the pad hard and solid and its shell free from liability of becoming dented or depressed out of shape in use, and a novel means of attaching the bail to said pad, serving also as a means of preventing the parts of its shell from becoming separated, dispensing with fastening ears or lugs, and leaving the top of the pad perfectly flat and free from obstructions.

In the accompanying drawings, which are to be taken as a part of this specification, and wherein corresponding parts in the different views are indicated by the same reference characters, Figure 1 is a perspective view of a heater embodying my invention. Fig. 2 is a top perspective view of the heating-pad. Fig. 3 is a perspective view of the stand for the heating-pad. Fig. 4 is a top plan view of a fragment of the lower member of the supporting-stand. Fig. 5 is a central vertical section through the whole heater.

The heater consists of a little stove which holds and gives out heat without consuming fuel or extra expense. It is made generally in two parts: first, a heating-pad comprising a shell or receptacle, of stamped steel or other suitable metal or material, containing a heat-retaining substance or composition adapted to be heated by placing the pad on a stove or over a fire or lamp; second, a bowl-shaped stand therefor, of similar or other material, with an asbestos or heat-protecting mat in its bottom, in which the pad is placed after having been heated.

The heating-pad (designated in the drawings by the letter A) is for the purpose of its present utility preferably made in the form of a circular block or cake with substantially flat top and bottom. Its external metal shell consists of two parts, a bowl-shaped body or receptacle and a cover having a depending peripheral flange which fits tightly around the upper edge of the receptacle and binds the parts together. The filling consists of a suitable substance or composition adapted to absorb, retain, and impart heat—such, for example, as a suitable cement or other plastic, clay, soapstone, or a mixture of the same— preferably placed in the shell in plastic condition and afterward allowed to set and harden. The particular filling which I preferably use is a plastic compound found to possess great heat-absorbing and heat-retaining properties; but its composition is a trade secret, and hence need not be disclosed here. As seen in Fig. 4, the bottom of the shell has an aperture or apertures $a$, while the filling has a cell or cells $a'$ corresponding therewith, into which the heat or flame enters when the pad is placed on a stove or over a fire, thus serving to heat the filling uniformly and quickly. The body of the shell is shown formed with circumferential ribs or corrugations, which serve to beautify and strengthen the shell, as well as to form internal grooves or means for engaging the filling, so that the filling when it sets becomes firmly bound in its receptacle. As a preferred mode of manufacture in filling the shell the heat-retaining substance in plastic form is placed in the receptacle setting right side up. After the receptacle has been filled completely and the material suitably packed the cover is fitted on and the shell is turned bottom side up. Then by means of plugs or pins inserted through the apertured bottom and driven into the plastic material the said material is rendered denser and caused to expand against the interior walls and fill up the shell in every part very compactly. By such means the pad is rendered hard and solid and its shell free from liability of becoming dented or depressed out of shape by accident or otherwise in use. The plugs are left in the material while still soft, and the pad is placed on steam-pipes or in a heating-oven for the purpose of drying the filling. After the filling has sufficiently set the plugs are withdrawn, leaving the aforesaid cells in the pad.

The novel method here described and the resultant article are not specifically claimed *per se* herein, but form the subject-matter of my application for patent for a "Heat-retainer and method of making the same," filed October 19, 1904, Serial No. 229,182.

A bail B is preferably provided for lifting the heating-pad with convenience. This is shown attached to the shell A by having its ends $b$ bent inward and inserted through registering apertures in the receptacle and the flange of its cover. Such means of attachment is simple and efficient, dispenses with the necessity of riveting ears on the pad, leaves the pad flat and free from obstructions on top, and also serves to secure the cover positively to its receptacle and prevents its being pulled off or worked loose. The medial handle portion of the bail projects sufficiently from the pad to prevent contact with the latter by the fingers when the bail is lifted; but the sides of the bail preferably hug the pad closely, so that when the bail is let down it will rest on the upper corrugation in the periphery of the shell, as shown in Figs. 1 and 2. This produces a more compact article and prevents the bail from dropping down too far.

The supporting-stand (designated in the drawings by the letter C) may be of any appropriate design and shape to accommodate the pad, but, as shown, consists of a bowl-shaped or saucer-shaped stamped steel member centrally riveted to an inverted-bowl-shaped stamped steel base. An asbestos mat or heat-protecting sheet D is provided in the bottom of the upper member, which may be secured therein by the same rivet which joins the two parts of the stand together. It will be observed that the part which holds the pad is substantially similar in shape to the cover of the shell, so that the bottom of the pad fits nicely in its stand.

Both the shell A and stand C are of such construction that their parts, being simple bowl-shaped or saucer-shaped pieces, can easily be stamped from sheet-steel or other metal, in which way they are desirably, though not necessarily, produced. When polished and nickel-plated or otherwise finished, the device makes a handsome and ornamental addition to a dining-room equipment.

The mode of use of the device is of course apparent. There is no extra cost in connection with the heater. While preparing a meal all that is necessary is to place the heating-pad on the stove or range. The pad will absorb heat and in twenty minutes time will be hot enough to keep a coffee-pot, platter, or other food-containing vessel hot two hours. The pad when taken off the stove is placed in its bowl-shaped stand, resting on the asbestos mat D, so as to prevent heating or injuring the table, and the dish or vessel to be heated is placed on the top of the pad. The heater will be found of great merit not only in keeping coffee and food warm at table, but also in the sick-room as a foot-warmer and for many other purposes.

The base $c'$ of the stand is preferably in the form of an inverted flaring vessel with an upper longitudinally-disposed annular portion provided with apertures $c^2$ and an upset central part $c^3$ within the series of apertures, upon which the member $c$ is mounted. These perforations are an important feature, since they prevent the stand in use from becoming hot enough to blister the varnish or polish of a table by providing an escape for the heat that would otherwise be retained therein.

The heating-pad A may be applied to other purposes than that illustrated and may be of any appropriate shape and construction, according to the particular use for which it is designed. For example, the pad may be suitably constructed to serve as a flat-iron.

Having thus fully described my invention, what I claim, and desire to secure by Letters Patent of the United States, is—

1. A heating-pad comprising a receptacle containing a heat-retaining substance and having a cover with a depending peripheral flange fitting over said receptacle, and a bail having its ends inserted through registering apertures in said receptacle and the flange of its cover.

2. A heating-pad comprising a shallow sheet-metal receptacle having peripheral corrugations which provide internal grooves, a heat-retaining filling of plastic substance packed therein, said filling being united to said receptacle by engagement with said internal grooves, and a flat sheet-metal cover having a depending peripheral flange fitting tightly over the top of said receptacle.

3. In a heater of the character described, the combination of a sheet-metal stand consisting of an inverted-bowl-shaped base and a surmounting saucer-shaped top riveted centrally together, a mat in the bottom of said saucer-shaped top, and a heating-pad having its bottom formed to fit in said saucer-shaped top and consisting of a sheet-metal shell containing a heat-retaining substance.

4. The combination of a circular heating-pad comprising a sheet-metal shell having flat top and bottom and having a handle and containing a heat-retaining substance, and a sheet-metal stand therefor comprising an inverted-bowl-shaped base having a contracted neck surrounded by a series of openings and a saucer-shaped top surmounting said neck adapted to fit the bottom of said pad and hold the same.

5. A sheet-metal stand for a heating-pad consisting of a stamped or drawn inverted-bowl-shaped base having a contracted neck or central upset portion at its top and a surrounding series of openings, and a stamped or drawn saucer-shaped top mounted on said neck and centrally riveted thereto.

In testimony whereof I affix my signature in presence of two witnesses.

CHARLES H. BOECK.

Witnesses:
G. E. Dow,
D. R. Tarbell.